United States Patent
Speit et al.

(10) Patent No.: US 8,431,501 B2
(45) Date of Patent: *Apr. 30, 2013

(54) LEAD-CONTAINING SPACE GLASS, ITS PRODUCTION AND USE

(75) Inventors: Burkhard Speit, Mainz (DE); Silke Wolff, Hueckeswagen (DE); Thorsten Doehring, Mainz (DE)

(73) Assignee: Schott AG, Mainz (DE)

( * ) Notice: Subject to any disclaimer, the term of this patent is extended or adjusted under 35 U.S.C. 154(b) by 255 days.

This patent is subject to a terminal disclaimer.

(21) Appl. No.: 12/819,254

(22) Filed: Jun. 21, 2010

(65) Prior Publication Data

US 2010/0323875 A1 Dec. 23, 2010

(30) Foreign Application Priority Data

Jun. 23, 2009 (DE) .......................... 10 2009 027 110

(51) Int. Cl.
*C03C 3/07* (2006.01)
*C03C 3/102* (2006.01)

(52) U.S. Cl.
USPC .................. 501/60; 501/61; 501/62; 501/74; 501/75

(58) Field of Classification Search ................... 501/60, 501/61, 62, 74, 75
See application file for complete search history.

(56) References Cited

FOREIGN PATENT DOCUMENTS

| DE | 3504558 | * | 8/1986 |
|---|---|---|---|
| DE | 4301057 | * | 3/1994 |
| GB | 1 515 042 | | 6/1978 |
| GB | 2 409 858 | | 7/2005 |
| JP | 53050217 | * | 5/1978 |
| RU | 2291124 | * | 1/2007 |

* cited by examiner

*Primary Examiner* — Karl Group
(74) *Attorney, Agent, or Firm* — Michael J. Striker

(57) ABSTRACT

The space glasses have a composition, in wt. % based on oxide content, including $SiO_2$, 12-45; $B_2O_3$, 0-4; $Al_2O_3$, 0-4; $TiO_2$, 0-5; PbO, 50-82; $Na_2O$, 0-4; $K_2O$, 0-8; and at least 0.1 wt. % of a total amount of at least three doping agents selected from $CeO_2$, $MoO_3$, $Bi_2O_3$, $WO_3$, $Ag_2O$, $SnO_2$, $Sb_2O_3$ and $As_2O_3$. Light-weight and space-saving optical systems for outer space applications can be made with these space glasses, which have high UV- and VIS-transmittance and high transmittance stability, because of their high radiation resistance based on their dopant content. A preferred process for making the space glass includes melting the above-stated oxide ingredients in a quartz crucible at 1050° C. to 1200° C. to form a melt and refining the melt at 1230° C. to 1350° C.

19 Claims, No Drawings

LEAD-CONTAINING SPACE GLASS, ITS PRODUCTION AND USE

CROSS-REFERENCE

The invention described and claimed herein below is also described in German Patent Application 10 2009 027 110.4, filed Jun. 23, 2009 in Germany. The aforesaid German Patent Application, whose subject matter is incorporated herein by reference thereto, provides the basis for a claim of priority of invention for the invention claimed herein below under 35 U.S.C. 119 (a)-(d).

Copending U.S. patent application Ser. No. 12/819,252, entitled "Lead-containing Space Glass, Its Production and Its Use", which was filed on Jun. 21, 2010, contains subject matter that is also disclosed and claimed herein below.

BACKGROUND OF THE INVENTION

The present invention relates to a lead-containing glass for use in space, hereinafter referred to as "space glass", and to a method of producing it as well as to its applications.

The invention also relates to specifically developed optical glasses having increased refractive indices of between nd=1.52 to 1.65 for the design of space-saving and light-weight imaging optics with lenses of different glass types for use in different objects travelling in space. The low total weight of the optics is decisive and can be realized more easily with lens optics than with mirror optics. Mirror optics should be used when imaging properties in the UV wavelength range below 350 nm are required, because of transmittance specifications. When optics are used in metal housings on different objects travelling through space, they are subjected to space radiation which depends on the orbit and the time period of the objects as well as the time point during the mission, and therefore, in addition to transmittance, they have to fulfil other requirements. In particular, they must have a UV-transmittance in a wavelength range between 300 and 800 nm which is as high as possible, a stability of transmittance over years which is as high as possible and nearly zero signs of aging of the materials, which would limit their applications due to compaction, haze or film-forming.

There are special requirements which must be fulfilled by space glass. Space radiation in the range of the low orbit of between 500 and 1000 km around the earth generally consists of electrons and protons and the resulting gamma radiation which is caused by collisions of the electrons and protons with other matter. When optical systems for monitoring space and for monitoring and measuring the surface of the earth are subjected to this radiation field during an exposure time of several years, especially gamma radiation at radiation doses of some 1000 rd (1 Gy=100 rd) due to the particle radiation impinging on the metal housings of the optics will also interact with the glass system as a secondary radiation.

The materials which are used in aeronautics technology have to fulfil the requirements of this special environment. In orbits in space around the earth the materials are subjected to weightlessness, extreme temperatures, temperature fluctuations, vacuum, micro meteorites, particle radiation from the upper atmosphere and electromagnetic high-energy radiation.

The most important gas in the interplanetary matter is neutral hydrogen which partially originates ionized as protons from inner areas of the planetary system. Additionally, free electrons with a frequency of ca. 5 $cm^{-3}$ are present at the earth-sun ($1.5\times10^{11}$ m) distance. The radiation environment of the earth contains these charged particles together with heavy high-energy particles and photons of the entire electromagnetic spectrum.

When an optic is used outside the spacecraft, then all the aforesaid kinds of radiation may directly affect the optical system with negative consequences. When this primary radiation e.g. affects the housing of the camera of the optic, then gamma radiation with a high operating range is produced in optic materials with known formation of color centers and increasing loss of transmittance.

Due to the dry thrust interfering with the optics in the starting phase of the objects travelling during space missions, the geometry of single lenses of the optics is limited to diameters of ca. 150 mm and maximum thicknesses of ca. 50 mm. For the design of optics for space basically two material classes of optical glass with a wide variety of optical positions (refractive index/dispersion) and a strongly limited selection of Cerium-stabilized radiation protective glasses are available. In Cerium-stabilized radiation protective glasses the ion $Ce^{3+}/Ce^{4+}$ which is incorporated into the glass prevents discoloration due to radiation exposure, because it may act as both an electron scavenger ($Ce^{4+}$) and electron donor ($Ce^{3+}$). However Cerium-stabilized radiation protective glasses cannot be used as optical glasses due to their unfavorable transmittance properties.

Both glass species are not suitable for stable optics with UV-transmittance for space missions, because the not radiation-resistant optical glasses especially have aging properties in the UV-VIS-range between 300 and 800 nm in the radiation field of space and the imaging properties of the optics are negatively changed during the mission by a steadily increasing discoloration and thus the aims of the mission may be compromised.

The second group of materials is radiation-resistant, but the transmittance thereof is already limited by strong self-absorption of the stabilizer $CeO_2$. This already applies to glasses with low doping rates of 1% by weight with readily polarizing cations.

Currently a high transmittance in the UV-VIS range is necessary for use, so only the not radiation-resistant material can be used as a component. In this case the optic has to be protected structurally against radiation by targeted shielding, which means additional volume in the spacecraft and additional mass for the mission. These measures would mean considerably higher costs for the space mission.

SUMMARY OF THE INVENTION

Therefore it is an object of the present invention to provide optical glasses which are radiation-resistant and which also have a high transmittance in a wavelength range between 300 and 800 nm.

A further object of the present invention is in particular the provision of highly refractive space glasses with high UV-transmittance and at the same time high radiation resistance over an exposure time of at least 5 to 10 years, in particular for the typical radiation field present in space, which consists of X-ray, electron and proton radiation with total doses of 1000 Gy as well as UV- and VIS-radiation.

In this case the degradation of optical properties of lens materials with a thickness of 10 mm should not include a loss of transmittance of more than 10% in the near UV spectral range of 400 to 450 nm.

These objects and others, which will become more apparent hereinafter, are attained according to the subject matter of the patent claims appended herein below.

These objects are in particular attained in a space glass with a composition comprising, in percent by weight based on oxide content:

| | |
|---|---|
| $SiO_2$ | 12-45 |
| $B_2O_3$ | 0-4 |
| $Al_2O_3$ | 0-4 |
| $TiO_2$ | 0-5 |
| PbO | 50-82 |
| $Na_2O$ | 0-4 |
| $K_2O$ | 0-8. |

To ensure that the space glasses have the required radiation resistance according to the present invention, they also contain at least three doping agents selected from the group consisting of $CeO_2$, $MoO_3$, $Bi_2O_3$, $WO_3$, AgO, $SnO_2$, $Sb_2O_3$ and $As_2O_3$. The total amount of these doping agents in the composition is at least 0.1 percent by weight of the space glass. It has been shown that the incorporation of the aforesaid doping agents in a variety of possible combinations leads to the desired effects according to the present invention. When the content is lower than 0.1 percent by weight, these effects are not observed.

Unless otherwise indicated in this description of the invention and in the appended claims, "%" or "percent" means percent by weight when used to indicate an amount of a component or substance.

The space glass preferably contains $TiO_2$. One reason for including $TiO_2$ is that it substantially improves the UV-resistance of the glass. But $TiO_2$ may degrade the transmittance properties of an optical glass, in particular at the UV-edge, by absorption. Therefore, the content of $TiO_2$ in the space glass is preferably limited to at most 1 percent by weight.

In the production method the glass melt is preferably subjected to a refining process in which the choice of the refining agent is adjusted to the glass composition. The refining agents preferably are selected from the group consisting of $Sb_2O_3$, $As_2O_3$, $CeO_2$, $SnO_2$, F, Cl and sulfates, which are used in a weight proportion of preferably up to 1 percent. When the space glass does not contain $CeO_2$, then the refining agents are preferably selected from the group consisting of $Sb_2O_3$, $As_2O_3$, F, Cl and sulfates, which are used in a weight proportion of preferably up to 0.5%. When the space glass comprises $CeO_2$, then preferably $CeO_2$, $SnO_2$, F, Cl or sulfates are used as refining agents, which are used in a weight proportion of preferably up to 1%. The refining process preferably may also be supported by the addition of small amounts of $Sb_2O_3$ and/or $As_2O_3$ in weight proportions of lower than 0.2 percent by weight. When the above-mentioned preferable provisions of the refining processes are fulfilled, then the production of a high-quality space glass is promoted. In preferred embodiments of the space glass nitrate compounds are used as additional refining agents. In particular they promote the refining process, when only small amounts of conventional refining agents can be used. Advantageously, they do not compromise the transmittance properties of the glasses.

The space glass preferably comprises at least 25% by weight of $SiO_2$. $SiO_2$ is an excellent glass-forming agent, provided good stability is an important criterion. Therefore, preferred embodiments of the space glass even comprise at least 29% by weight of $SiO_2$. But the content of $SiO_2$ should not be chosen too great, because otherwise no suitable refractive index for optical uses can be obtained. Therefore, the space glass should contain amounts of $SiO_2$ of preferably at most 43% by weight, more preferably at most 42% by weight.

The space glass preferably comprises at most 4% by weight of $B_2O_3$. This component is used as a fluxing agent and network former in the glass. In contrast to $SiO_2$ it is only contained in low amounts, because it is not suitable for the adjustment of desired optical properties together with high resistance. Therefore, preferred embodiments are also free of $B_2O_3$.

The same is true of aluminium oxide, which is preferably contained in an amount of at most 2% by weight of $Al_2O_3$. Preferred embodiments are free of $Al_2O_3$.

A content of $ZrO_2$ which is too high would increase the viscosity of the space glass and would thus compromise its workability. Thus preferred embodiments of the space glass are free of $ZrO_2$. The same is true of ZnO and CaO. Preferred embodiments are free of ZnO and/or CaO.

The space glass preferably comprises at most 75% by weight of PbO. This component is the essential component of the space glass which makes it possible to achieve the required refractive indices and dispersions. Therefore a large proportion of the glass is comprised of PbO, however this proportion should not be too great, because otherwise the stability of the glass would be negatively influenced. In preferred embodiments the space glasses according to the present invention comprise at most 70% by weight of PbO. PbO and $SiO_2$ are accountable for the general properties of the glass, namely its optical position and radiation resistance, so that the sum of these components is preferably in a range of at most 85 to 99% by weight. Otherwise it might be that in this case—dependent on other components—the preferred properties cannot be achieved. Preferably the space glass contains at most 90 to 99% by weight, preferably at most 91 to 98% by weight, of a total amount of $SiO_2$ and PbO. The adjustment of the correct composition of the glass can be conducted very easily in preferred embodiments, when a mass ratio of $SiO_2$ to PbO is less than 1. More preferably, this mass ratio of $SiO_2$ to PbO should be less than 0.85 and most preferably less than 0.65. If this mass ratio is too high, then the desired refractive index often cannot be achieved.

The space glass preferably contains at most 0 to 10% by weight of a total amount of alkali metal oxides. In more preferred embodiments this total amount is at most 0 to 8%, preferably 0 to 4% by weight. Alkali metal oxides lower the melting temperature of the glass so that they are preferably contained in the space glass. But if this content is too great, then a glass is obtained that has stability and viscosity which are too low. Preferably the space glass according to the present invention comprises both $Na_2O$ and $K_2O$.

The following limitations regarding the amounts of these alkali metal oxides are preferred. The space glass should comprise at most 2% by weight of $Na_2O$, preferably at most 1% by weight of $Na_2O$. The space glass should comprise at most 7% by weight of $K_2O$, preferably at most 2% by weight of $K_2O$.

Alkaline earth metal oxides are used for adjustment of the viscosity-temperature-profile of the glass. But if they are included in the glass in too great amounts, the viscosity of the glass is too low. Preferred embodiments of the composition do not include alkaline earth metal oxides.

The desired long-term radiation stability of the space glass according to the present invention can only be achieved, if suitable doping agents are added. Preferred embodiments contain one or more doping agents selected from the group consisting of $CeO_2$, $As_2O_3$, $Sb_2O_3$ and $SnO_2$. Preferably the total amount of these doping agents in the space glass is less than 0.15% by weight. Even more preferably the total amount of these doping agents in the space glass is at most 0.6% by weight and most preferably at most 0.5% by weight.

The individual upper limits for the content in % by weight of the aforesaid doping agents are preferable as follows:

| | |
|---|---|
| $CeO_2$ | 1 |
| $As_2O_3$ | 0.02 |
| $Sb_2O_3$ | 0.3 |
| $SnO_2$ | 0.35. |

More preferably these upper limits are:

| | |
|---|---|
| $CeO_2$ | 0.5 |
| $As_2O_3$ | 0.01 |
| $Sb_2O_3$ | 0.25 |
| $SnO_2$ | 0.3. |

Most preferably these upper limits are:

| | |
|---|---|
| $CeO_2$ | 0.25 |
| $As_2O_3$ | 0.01 |
| $Sb_2O_3$ | 0.2 |
| $SnO_2$ | 0.2. |

One hypothesis regarding the mechanism by which these doping agents act is that they reduce radiation-induced redox processes in the glass and thus improve long-term stability in the aggressive environment of space. But amounts of these doping agents which are too high would negatively influence the transmittance properties of the glass.

Preferable space glasses additionally contain one or more doping agents selected from the group consisting of CuO and $Ag_2O$ in a total amount of at least 0.001% by weight. More preferably the total amount of the doping agents in the space glass is at most 0.4% by weight and most preferably at most 0.3% by weight.

The individual upper limits for the content in % by weight of the aforesaid doping agents are preferable as follows:

| | |
|---|---|
| CuO | 0.002 |
| $Ag_2O$ | 0.2. |

More preferably these upper limits are:

| | |
|---|---|
| CuO | 0.001 |
| $Ag_2O$ | 0.1. |

The proportions of these doping agents should not be too great, because otherwise they would negatively influence the transmittance. The advantage of these doping agents is that they, on the one hand, absorb light, but on the other hand, they can spontaneously repair defect centers that are formed, so that there is no negative influence on the transmittance.

Preferable space glasses additionally contain one or more doping agents selected from the group consisting of $MoO_3$, $Bi_2O_3$ and $WO_3$ in a total amount of at least 0.1% by weight. More preferably the total amount of these doping agents in the space glass is at most 1.0% by weight and most preferably at most 0.6% by weight.

The individual upper limits for the content in % by weight of the aforesaid doping agents are preferably as follows:

| | |
|---|---|
| $MoO_3$ | 0.5 |
| $Bi_2O_3$ | 0.5 |
| $WO_3$ | 0.5. |

More preferably these upper limits are:

| | |
|---|---|
| $MoO_3$ | 0.3 |
| $Bi_2O_3$ | 0.3 |
| $WO_3$ | 0.3. |

Most preferably these upper limits are:

| | |
|---|---|
| $MoO_3$ | 0.2 |
| $Bi_2O_3$ | 0.2 |
| $WO_3$ | 0.2. |

These three doping agents are characterized by their good polarizability. One hypothesis is that this property results in the following effect: incident radiation is captured by these oxides and is transferred to the lattice as vibration (radiationless relaxation) without producing defects in the glass. Amounts of these components which are too great result in loss of transmittance.

Space glasses according to the present invention are preferably free of coloring ions, because those ions impair transmittance. This is in particular true for iron, nickel and cobalt compounds.

The space glasses according to the present invention are designed for use in space. Advantageously they can be used in lens optics.

A preferred embodiment of the space glass has a composition comprising in % by weight based on oxide content:

| | |
|---|---|
| $SiO_2$ | 12-45 |
| $B_2O_3$ | 0-4 |
| $Al_2O_3$ | 0-2 |
| $TiO_2$ | 0-5 |
| PbO | 50-82 |
| $Na_2O$ | 0-4 |
| $K_2O$ | 0-8 |
| $CeO_2$ | 0-0.1 |
| $Sb_2O_3$ | 0-1, | wherein a total amount of the components $Sb_2O_3$, $As_2O_3$, CuO, $Ag_2O$, $Bi_2O_3$, $WO_3$ and $SnO_2$ in the composition is 0.1 to 2% by weight, a total amount of the components $CeO_2$, $MoO_3$, $Bi_2O_3$, $WO_3$, AgO, $SnO_2$, $Sb_2O_3$ and $As_2O_3$ in the composition is 0.1 to 2% by weight and a sum total of $Bi_2O_3$, $WO_3$ and $MoO_3$ in the composition is greater than 1000 ppm.

The space glasses described herein are excellently suitable for the construction of optical systems for use in space. According to the present invention the above-described space glasses are used as components in optical systems in space.

According to the present invention it is preferable that at least 95% by weight of the space glass comprises the components: $SiO_2$, $B_2O_3$, $Al_2O_3$, PbO, $Na_2O$, $K_2O$, $CeO_2$, $Sb_2O_3$, $As_2O_3$, CuO, $Ag_2O$, $Bi_2O_3$, $WO_3$, $SnO_2$, $MoO_3$ and $TiO_2$. In especially preferred embodiments the glass according to the present invention consists of 98% by weight of the aforesaid components. Thereby it is guaranteed that the glass according to the present invention has the required properties for use in space.

Preferred embodiments of the glasses according to the present invention are generally free of ingredients which are not mentioned herein. "Generally free of" means in this case that the ingredients, of which the glasses are generally free, are present in the glasses only as impurities and not as deliberately and/or target-oriented added components.

This invention further relates to a method for production of the above-described space glasses. The method comprises the following steps:
mixing the glass components,
melting the mixture at temperatures of 1050 to 1200° C. and
refining the melt at temperatures of 1230 to 1350° C.

The production of the glasses is preferably conducted in a quartz crucible, because other crucibles will lead to impurities in the glass.

For comparison many experiments have been conducted. It was determined that after irradiation with a dose of 1.5 krd (X-ray radiation 40 kV over 10 hours) the transmittance decrease was on the order of about 5%, whereas in the case of glasses without doping the transmittance decrease was about 15%.

TABLE I

Composition and Properties of Examples of the Space Glasses

|  | BG1 | BG2 | BG3 | BG4 | BG5 | BG6 | BG7 | BG8 |
|---|---|---|---|---|---|---|---|---|
| $SiO_2$ | 41.19 | 34.3 | 31.74 | 30.45 | 29.55 | 27.15 | 24.2 | 14.95 |
| $B_2O_3$ | 0 | 0 | 0 | 0 | 0 | 0 | 0 | 3.1 |
| $Al_2O_3$ | 0 | 0 | 1.8 | 0 | 2.7 | 0 | 0 | 0 |
| $TiO_2$ | 0 | 4 | 3.8 | 0.1 | 3.7 | 0.1 | 0.1 | 0.2 |
| PbO | 50.7 | 57.15 | 60.45 | 66.3 | 63.2 | 70.8 | 73.9 | 80.45 |
| $Na_2O$ | 1.15 | 1.6 | 1 | 0.7 | 0.5 | 0.5 | 0.34 | 0 |
| $K_2O$ | 6.4 | 1.9 | 0.9 | 1.9 | 0 | 1 | 0.6 | 0.5 |
| $SiO_2 + PbO$ | 91.89 | 91.45 | 92.19 | 96.75 | 92.75 | 97.95 | 98.1 | 95.4 |
| $SiO_2/PbO$ | 0.81 | 0.60 | 0.53 | 0.46 | 0.47 | 0.38 | 0.33 | 0.19 |
| Sum (alkali) | 7.55 | 3.5 | 1.9 | 2.6 | 0.5 | 1.5 | 0.94 | 0.5 |
| $CeO_2$ | 0 | 0.2 | 0 | 0 | 0.2 | 0.05 | 0.01 | 0 |
| $As_2O_3$ | 0.01 | 0 | 0.01 | 0 | 0 | 0 | 0 | 0 |
| $Sb_2O_3$ | 0.2 | 0.1 | 0.2 | 0.3 | 0.05 | 0.05 | 0 | 0.25 |
| $SnO_2$ | 0 | 0.15 | 0 | 0 | 0 | 0.2 | 0.3 | 0.1 |
| Sum | 0.21 | 0.45 | 0.21 | 0.3 | 0.25 | 0.3 | 0.31 | 0.35 |
| CuO | 0.001 | 0 | 0.001 | 0.002 | 0 | 0 | 0 | 0.001 |
| $Ag_2O$ | 0 | 0.1 | 0 | 0.1 | 0.1 | 0.05 | 0 | 0 |
| Sum | 0.001 | 0.25 | 0.001 | 0.102 | 0.1 | 0.25 | 0.3 | 0.101 |
| $MoO_3$ | 0 | 0.2 | 0 | 0.3 | 0 | 0.15 | 0.3 | 0 |
| $Bi_2O_3$ | 0.2 | 0.1 | 0.1 | 0.05 | 0 | 0 | 0.1 | 0.3 |
| $WO_3$ | 0.15 | 0.2 | 0 | 0.1 | 0 | 0 | 0.15 | 0.15 |
| Sum | 0.35 | 0.5 | 0.1 | 0.45 | 0 | 0.15 | 0.55 | 0.45 |
| nd | 1.647 | 1.741 | 1.762 | 1.755 | 1.785 | 1.805 | 1.846 | 1.952 |
| nh (404 nm) | 1.682 | 1.791 | 1.815 | 1.805 | 1.842 | 1.864 | 1.913 | 2.043 |
| T*400nmv | 86.7 | 64.7 | 51.1 | 79.1 | 44.9 | 79.0 | 68.7 | 28.8 |
| T*450nmv | 87.7 | 73.4 | 69.3 | 83.2 | 56.8 | 82.3 | 76.2 | 63.9 |
| T*400nmn | 82.2 | 61.3 | 48.4 | 75.2 | 42.1 | 76.1 | 65.2 | 25.1 |
| T*450nmn | 83.1 | 69.9 | 65.2 | 79.4 | 53.5 | 79.8 | 72.0 | 59.7 |

*Transmittance for 10 mm thick sample;
index v: before irradiation;
index n: after irradiation While the invention has been illustrated and described as embodied in a lead-containing space glass, its production and its use, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:
1. A space glass with a composition, in percent by weight based on oxide content, comprising:

| | |
|---|---|
| $SiO_2$ | 12-45 |
| $B_2O_3$ | 0-4 |
| $Al_2O_3$ | 0-4 |
| $TiO_2$ | 0-5 |
| PbO | 50-82 |
| $Na_2O$ | 0-4 |
| $K_2O$ | 0-8, | and at least three doping agents selected from the group consisting of $CeO_2$, $MoO_3$, $Bi_2O_3$, $WO_3$, $Ag_2O$, $SnO_2$, $Sb_2O_3$ and $As_2O_3$;
wherein a total amount of said at least three doping agents in said composition is at least 0.1 percent by weight; and
wherein a sum total amount of alkali metal oxides in the space glass is at least 0.5 wt. %.

2. The space glass according to claim 1, wherein the composition comprises at least four of said doping agents.

3. The space glass according to claim 1, wherein the composition comprises at least five of said doping agents.

4. The space glass according to claim 1, wherein the composition comprises from 0 to 1 percent by weight of $TiO_2$.

5. The space glass according to claim 1, wherein the composition comprises at least 25 percent by weight of $SiO_2$.

6. The space glass according to claim 1, wherein the composition comprises at most 43 percent by weight of $SiO_2$.

7. The space glass according to claim 1, wherein the composition comprises at most 2 percent by weight of $Al_2O_3$.

8. The space glass according to claim 1, wherein the composition comprises at most 75 percent by weight of PbO.

9. The space glass according to claim 1, wherein the composition comprises at least 50.5 percent by weight of PbO.

10. The space glass according to claim 1, wherein the composition comprises at most 2 percent by weight of $Na_2O$.

11. The space glass according to claim 1, wherein the composition comprises at most 7 percent by weight of $K_2O$.

12. The space glass according to claim 1, wherein the composition comprises a total amount of at most 85 to 99 percent by weight of $SiO_2$ and PbO.

13. The space glass according to claim 1, wherein the composition comprises at least 0.15 percent by weight of at least one dopant ingredient selected from the group consisting of $CeO_2$, $As_2O_3$, $Sb_2O_3$ and $SnO_2$.

14. A space glass with a composition, in percent by weight based on oxide content, comprising:

| | |
|---|---|
| $SiO_2$ | 12-45 |
| $B_2O_3$ | 0-4 |
| $Al_2O_3$ | 0-4 |
| $TiO_2$ | 0-5 |
| PbO | 50-82 |
| $Na_2O$ | 0-4 |
| $K_2O$ | 0-8 |
| and at least four doping agents | | wherein a total amount of said at least four doping agents in said composition is at least 0.1 percent by weight; and
wherein the composition comprises $CeO_2$ in an amount not more than 1 percent by weight, $As_2O_3$ in an amount not more than 0.02 percent by weight, $Sb_2O_3$ in an amount not more than 0.3 percent by weight, and $SnO_2$ in an amount not more than 0.35 percent by weight, as dopant ingredients.

15. The space glass according to claim 1, wherein the composition comprises at least one dopant ingredient selected from the group consisting of CuO and $Ag_2O$ in a total amount of at least 0.001% by weight.

16. The space glass according to claim 1, wherein the composition comprises CuO in an amount not more than 0.002 percent by weight and $Ag_2O$ in an amount not more than 0.2 percent by weight, as dopant ingredients.

17. The space glass according to claim 1, wherein the composition comprises at least one dopant ingredient selected from the group consisting of $MoO_3$, $Bi_2O_3$ and $WO_3$ in a total amount of at least 0.1% by weight.

18. A space glass with a composition, in percent by weight based on oxide content, comprising:

| | |
|---|---|
| $SiO_2$ | 12-45 |
| $B_2O_3$ | 0-4 |
| $Al_2O_3$ | 0-4 |
| $TiO_2$ | 0-5 |
| PbO | 50-82 |
| $Na_2O$ | 0-4 |
| $K_2O$ | 0-8 |
| and at least three doping agents | | wherein a total amount of said at least three doping agents in said composition is at least 0.1 percent by weight; and wherein the composition comprises $MoO_3$ in an amount not more than 0.5 percent by weight, $Bi_2O_3$ in an amount not more than 0.5 percent by weight, and $WO_3$ in an amount not more than 0.5 percent by weight, as dopant ingredients.

19. An optical system for use in space, comprising a space glass according to claim 1.

* * * * *